US010861452B2

(12) United States Patent
Nakano et al.

(10) Patent No.: US 10,861,452 B2
(45) Date of Patent: Dec. 8, 2020

(54) OBJECT AUTHENTICATION DEVICE AND OBJECT AUTHENTICATION METHOD

(71) Applicant: HONDA MOTOR CO., LTD., Tokyo (JP)

(72) Inventors: Mikio Nakano, Wako (JP); Tomoyuki Sahata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 137 days.

(21) Appl. No.: 15/934,306

(22) Filed: Mar. 23, 2018

(65) Prior Publication Data

US 2018/0286397 A1 Oct. 4, 2018

(30) Foreign Application Priority Data

Mar. 29, 2017 (JP) ................................ 2017-065863

(51) Int. Cl.
*G10L 15/22* (2006.01)
*G06K 9/00* (2006.01)
(Continued)

(52) U.S. Cl.
CPC .......... *G10L 15/22* (2013.01); *G06K 9/00201* (2013.01); *G06K 9/00577* (2013.01);
(Continued)

(58) Field of Classification Search
CPC ...... G06F 17/28; G06F 17/274; G06F 16/951; G06F 16/24578; G06F 16/50;
(Continued)

(56) References Cited

U.S. PATENT DOCUMENTS 10,043,069 B1* 8/2018 Liu .................... G06K 9/00442
2011/0150270 A1* 6/2011 Carpenter .............. G06Q 50/32
382/101

(Continued)

FOREIGN PATENT DOCUMENTS

JP 2002-312796 A 10/2002
JP 2014-170295 9/2014
JP 2015-049843 3/2015

OTHER PUBLICATIONS

Japanese Notice of Allowance with English translation dated Jul. 2, 2019, 6 pages.
Japanese Office Action dated Dec. 4, 2018 with English translation, 6 pages.

*Primary Examiner* — Richemond Dorvil
*Assistant Examiner* — Mark Villena
(74) *Attorney, Agent, or Firm* — Rankin, Hill & Clark LLP

(57) ABSTRACT

An object authentication device includes a speech recognition unit configured to obtain candidates for a speech recognition result for an input speech and a likelihood of the speech as a speech likelihood, an image model generation unit configured to obtain image models of a predetermined number of candidates for the speech recognition result in descending order of speech likelihoods, an image likelihood calculation unit configured to obtain an image likelihood based on an image model of an input image, and an object authentication unit configured to perform object authentication using the image likelihood, wherein vocabularies predicted through speech recognition are categorized and the image model is formed in association with a category.

5 Claims, 5 Drawing Sheets

(51) Int. Cl.
*G10L 25/54* (2013.01)
*G10L 15/183* (2013.01)
*G10L 15/02* (2006.01)
*G06K 9/46* (2006.01)
*G10L 15/26* (2006.01)
*G10L 15/24* (2013.01)

(52) U.S. Cl.
CPC ............ *G06K 9/4676* (2013.01); *G10L 15/02* (2013.01); *G10L 15/183* (2013.01); *G10L 15/26* (2013.01); *G10L 25/54* (2013.01); *G10L 15/24* (2013.01)

(58) Field of Classification Search
CPC ............... G06K 9/6267; G06K 9/4609; G06K 9/00456; G10L 15/00; G10L 15/265
See application file for complete search history.

(56) References Cited

U.S. PATENT DOCUMENTS

| | | | |
|---|---|---|---|
| 2013/0163887 A1* | 6/2013 | Nakano | G06K 9/6254 382/224 |
| 2013/0226850 A1* | 8/2013 | Hannuksela | G10L 25/48 706/14 |
| 2014/0249814 A1* | 9/2014 | Nakano | G10L 15/00 704/235 |
| 2015/0104065 A1* | 4/2015 | Park | G06K 9/00624 382/103 |
| 2016/0180315 A1* | 6/2016 | Kanamori | G06Q 20/208 705/23 |
| 2017/0045957 A1* | 2/2017 | Holmgren | G06F 3/0354 |
| 2017/0134803 A1* | 5/2017 | Shaw | H04N 21/4126 |
| 2017/0160813 A1* | 6/2017 | Divakaran | G06F 3/017 |
| 2017/0262051 A1* | 9/2017 | Tall | G06F 3/013 |
| 2018/0165518 A1* | 6/2018 | Assaf | G06K 9/00671 |

* cited by examiner

FIG. 2

| CATEGORY | ITEM |
|---|---|
| VEHICLES | SHINKANGSEN |
| | MOTORCYCLE |
| | CAR |
| | TRAIN |
| | ... |
| FRUITS | APPLE |
| | ORANGE |
| | BANANA |
| | STRAWBERRY |
| | ... |
| TABLEWARE | KNIFE |
| | FORK |
| | TONGS |
| | ... |
| ... | ... |

FIG. 3

| DICTIONARY | ITEM |
|---|---|
| RINGO JUICE | APPLE JUICE |
| | RINGO JUICE |

| CATEGORY | URL ADDRESS | REMARKS |
|---|---|---|
| VEHICLES | http://www.norimono1 | IMAGE INFORMATION OF AIRPLANE |
| | http://www.norimono2 | IMAGE INFORMATION OF YACHT |
| | http://www.norimono3 | IMAGE INFORMATION OF TANKER |
| | ... | ... |
| FRUITS | http://www.kudamono1 | ... |
| | http://www.kudamono2 | ... |
| | http://www.kudamono3 | ... |
| | ... | ... |
| TABLEWARE | http://www.shokki1 | ... |
| | http://www.shokki2 | ... |
| | http://www.shokki3 | ... |
| | ... | ... |
| ... | ... | ... |

OBJECT AUTHENTICATION DEVICE AND OBJECT AUTHENTICATION METHOD

CROSS-REFERENCE TO RELATED APPLICATION

Priority is claimed on Japanese Patent Application No. 2017-065863, filed Mar. 29, 2017, the content of which is incorporated herein by reference.

BACKGROUND OF THE INVENTION

Field of the Invention

The present invention relates to an object authentication device and an object authentication method.

Description of Related Art

When a robot performs a task in a home environment, it is necessary to achieve at least an object gripping task of gripping an object indicated by a user. In such a task, for example, the user issues an instruction by speech and the robot performs object authentication on the basis of a speech recognition result of the user's speech. Also, the robot can acquire image information of an object around the robot through an imaging device.

As a system for authenticating such an object, a method of integrating speech information and image information has been proposed (for example, see Y. Ozasa et al., "Disambiguation in Unknown Object Detection by Integrating Image and Speech Recognition Confidences," ACCV, 2012 (hereinafter referred to as Non-Patent Literature 1)). However, in the technology described in Non-Patent Literature 1, both a speech model and an image model are required when object authentication is performed. Although it is easy for the object authentication system to hold such a speech model, it is difficult to actually hold a large number of image models because the file size thereof is large.

Thus, as a system for authenticating an object, technology for authenticating a target object on the basis of speech likelihood and an image likelihood has been disclosed (for example, see Japanese Unexamined Patent Application, First Publication No. 2014-170295 (hereinafter referred to as Patent Literature 1)).

SUMMARY OF THE INVENTION

In the technology disclosed in Patent Literature 1, a target image is read from an image model on the basis of a speech likelihood, and object authentication is performed on the basis of an image likelihood by reading an image from the web when there is no target image in the image model. However, in the technology disclosed in Patent Literature 1, retrieval of an image from the web is likely to be time-consuming and there is a problem of deterioration of an object authentication speed.

An aspect according to the present invention has been made in view of the above-described problems, and an objective of the aspect according to the present invention is to provide an object authentication device and an object authentication method capable of improving an object authentication speed.

In order to achieve the above-described objective, the present invention adopts the following aspects.

(1) According to an aspect of the present invention, an object authentication device includes a speech recognition unit configured to obtain candidates for a speech recognition result for an input speech and a likelihood of the speech as a speech likelihood; an image model generation unit configured to obtain image models of a predetermined number of candidates for the speech recognition result in descending order of speech likelihoods; an image likelihood calculation unit configured to obtain an image likelihood based on an image model of an input image; and an object authentication unit configured to perform object authentication using the image likelihood, wherein vocabularies predicted through speech recognition are categorized and the image model is formed in association with a category.

(2) In the above-described aspect (1), the object authentication device may further include an image model storage unit configured to store the image models and the object authentication unit may acquire an image via a network and generate the image model from the acquired image to authenticate an object if the image model storage unit does not store a target image model.

(3) In the above-described aspect (2), a uniform resource locator (URL) address may be classified in accordance with the category in the image model storage unit.

(4) In any one of the above-described aspects (1) to (3), the object authentication device may further include an acoustic model storage unit configured to store acoustic models to be used in the speech recognition and the acoustic models may be stored as a dictionary in association with vocabularies having the same meaning.

(5) According to an aspect of the present invention, an object authentication method includes a speech recognition step in which a speech recognition unit obtains candidates for a speech recognition result for an input speech and a likelihood of the speech as a speech likelihood; an image model generation step in which an image model generation unit obtains image models of a predetermined number of candidates for the speech recognition result in descending order of speech likelihoods; an image likelihood calculation step in which an image likelihood calculation unit obtains an image likelihood based on an image model of an input image; and an object authentication step in which an object authentication unit performs object authentication using the image likelihood, wherein vocabularies predicted through speech recognition are categorized and the image model is formed in association with a category.

According to the above-described aspects (1) and (5), there is an advantageous effect in that it is possible to improve an authentication speed when the object is authenticated in a model because speech information and image information are categorized and stored.

According to the above-described aspect (2), it is possible to retrieve a target image in a wider range via a network and improve the accuracy of authentication.

According to the above-described aspect (3), it is possible to improve a retrieval speed and improve an object authentication speed because images are stored according to each category even when an image is retrieved via a network.

According to the above-described aspect (4), it is possible to improve an accuracy of speech recognition because vocabularies having the same meaning are registered as a dictionary.

BRIEF DESCRIPTION OF THE DRAWINGS

FIG. 2 is a diagram illustrating an example of information stored in an acoustic model/dictionary DB according to the present embodiment.

FIG. 3 is a diagram illustrating an example of a dictionary stored in the acoustic model/dictionary DB according to the present embodiment.

DETAILED DESCRIPTION OF THE INVENTION

Hereinafter, embodiments of the present invention will be described with reference to the drawings.

Figure 1:
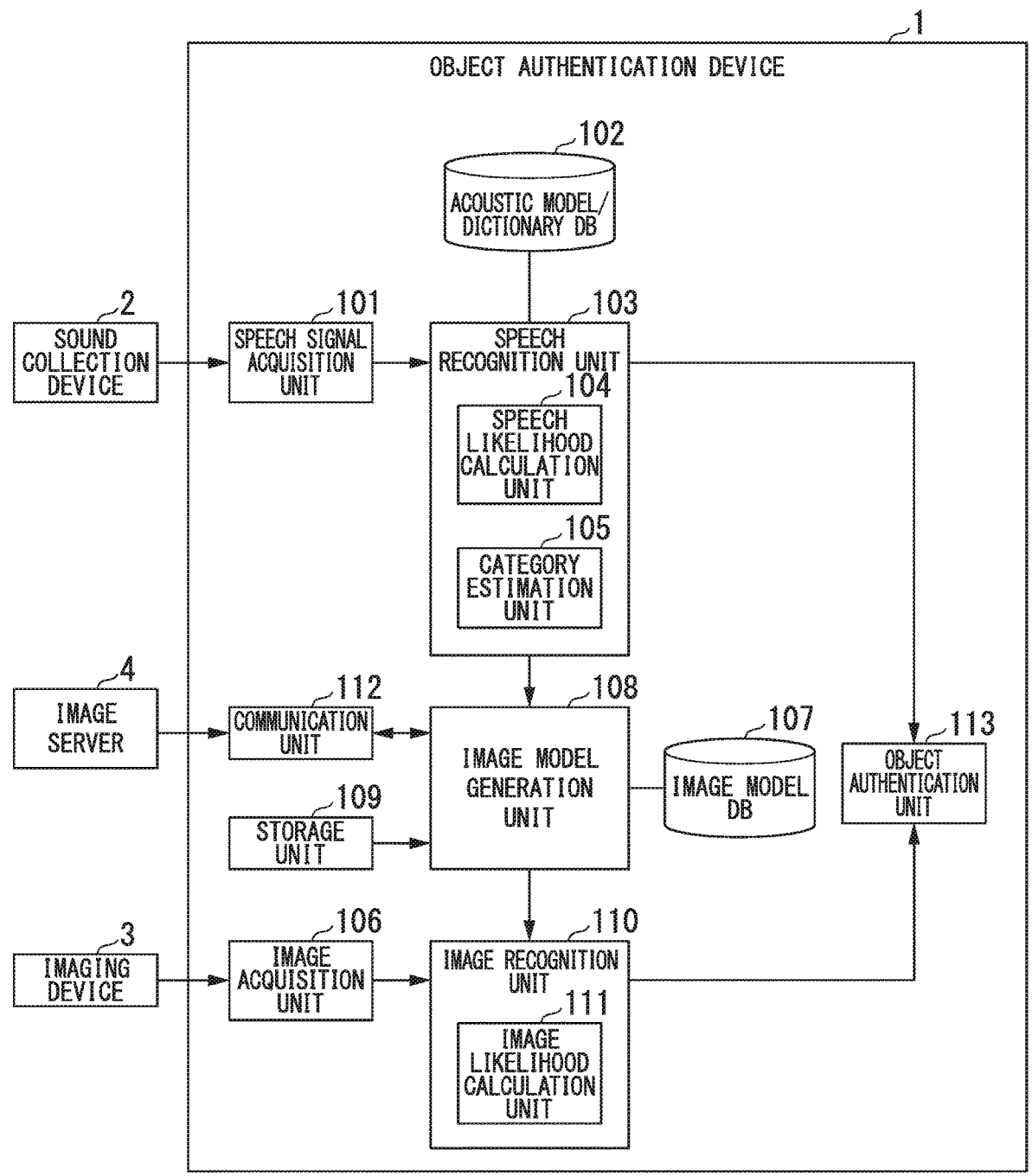
FIG. 1 is a block diagram illustrating an example of a configuration of an object authentication device according to the present embodiment.

FIG. 1 is a block diagram illustrating an example of a configuration of an object authentication device 1 according to the present embodiment. As illustrated in FIG. 1, the object authentication device 1 includes a speech signal acquisition unit 101, an acoustic model/dictionary DB 102, a speech recognition unit 103, an image acquisition unit 106, an image model DB 107, an image model generation unit 108, a storage unit 109, an image recognition unit 110, a communication unit 112, and an object authentication unit 113. Also, the speech recognition unit 103 includes a speech likelihood calculation unit 104 and a category estimation unit 105. The image recognition unit 110 includes an image likelihood calculation unit 111.

A sound collection device 2 and an imaging device 3 are connected to the object authentication device 1. The object authentication device 1 is connected to an image server 4 via a network.

The sound collection device 2 is, for example, a microphone that collects a signal of a speech spoken by a user, converts the collected speech signal from an analog signal into a digital signal, and outputs the speech signal converted into the digital signal to the object authentication device 1. Also, the sound collection device 2 may be configured to output the speech signal having the analog signal to the object authentication device 1. The sound collection device 2 may be configured to output the speech signal to the object authentication device 1 via a wired cord or a cable, or may be configured to wirelessly transmit the speech signal to the object authentication device 1.

Also, the sound collection device 2 may be a microphone array. In this case, the sound collection device 2 includes P microphones arranged at different positions. Then, the sound collection device 2 generates acoustic signals of P channels (P is an integer of 2 or more) from the collected sound and outputs the generated acoustic signals of the P channels to the object authentication device 1.

The imaging device 3 is, for example, a charge-coupled device (CCD) image sensor camera, a complementary metal-oxide-semiconductor (CMOS) image sensor camera, or the like. The imaging device 3 captures an image and outputs the captured image to the object authentication device 1. Also, the imaging device 3 may be configured to output the image to the object authentication device 1 via a wired cord or a cable, or may be configured to wirelessly transmit the image to the object authentication device 1.

The image is stored in the image server 4. Images are classified into categories, as will be described below, and a uniform resource locator (URL) address may be assigned to each category. Also, resolutions of the images may be the same or different. The image server 4 may be an arbitrary site on the Internet. In this case, the object authentication device 1 may be configured to retrieve an image for a candidate recognized by the speech recognition unit 103 from the Internet using a search engine, and may be configured to acquire, for example, a higher-order image. In this case, the object authentication device 1 may also be configured to acquire a label or a name attached to the image.

The object authentication device 1 authenticates the object using the acquired speech signal and image signal. For example, the object authentication device 1 is incorporated in a humanoid robot, a receiving device, an industrial robot, a smartphone, a tablet terminal, and the like.

Also, if the sound collection device 2 is a microphone array, the object authentication device 1 further includes a sound source localization unit, a sound source separation unit, and a sound source identification unit. In this case, in the object authentication device 1, the sound source localization unit performs sound source localization using a transfer function pre-generated for a speech signal acquired by the speech signal acquisition unit 101. Then, the object authentication device 1 identifies a speaker using a result of the localization by the sound source localization unit. The object authentication device 1 performs sound source separation on the speech signal acquired by the speech signal acquisition unit 101 using the result of the localization by the sound source localization unit. Then, the speech recognition unit 103 of the object authentication device 1 performs utterance section detection and speech recognition on the separated speech signal (see, for example, Japanese Unexamined Patent Application, First Publication No. 2017-9657). Also, the object authentication device 1 may be configured to perform an echo suppression process.

The speech signal acquisition unit 101 acquires a speech signal output by the sound collection device 2 and outputs the acquired speech signal to the speech recognition unit 103. Also, if the acquired speech signal is an analog signal, the speech signal acquisition unit 101 converts the analog signal into a digital signal and outputs the speech signal converted into the digital signal to the speech recognition unit 103.

In the acoustic model/dictionary DB 102, for example, an acoustic model, a language model, a word dictionary, and the like are stored. The acoustic model is a model based on a feature quantity of sound, and the language model is a model of information of words (vocabularies) and an arrangement thereof. The word dictionary is a dictionary based on a large number of vocabularies, for example, a large vocabulary word dictionary. As will be described below with reference to FIG. 2, the acoustic model/dictionary DB 102 stores an acoustic model for each category of an object.

Categories of objects are, for example, foods, vehicles, tableware, and the like.

The speech recognition unit 103 acquires a speech signal output by the speech signal acquisition unit 101 and detects a speech signal of an utterance section from the acquired speech signal. For detection of the utterance section, for example, a speech signal having a predetermined threshold value or more is detected as the utterance section. Also, the speech recognition unit 103 may detect the utterance section using another well-known method. For example, the speech recognition unit 103 extracts a Mel-scale logarithmic spectrum (MSLS), which is an acoustic feature quantity, from a speech signal for each utterance section. Also, the MSLS is obtained using a spectral feature quantity as a feature quantity of acoustic recognition and performing an inverse discrete cosine transform on a Mel-frequency cepstrum coefficient (MFCC). Also, in the present embodiment, for example, the utterance is a word (vocabulary) having a name of an object such as "apple," "motorcycle," or "fork."

The speech likelihood calculation unit 104 calculates a speech likelihood $L_s(s;\Lambda_i)$ using, for example, a hidden Markov model (HMM)) with reference to the acoustic model/dictionary DB 102 with respect to the extracted acoustic feature quantity. Also, the speech likelihood $L_s(s;\Lambda_i)$ is obtained by calculating a posteriori probability $p(\Lambda_i|s)$. Here, s is the acoustic feature quantity and $\Lambda_i$ is a speech model of an $i^{th}$ object stored in the acoustic model/dictionary DB 102. Also, the speech likelihood $L_s$ is a value from 0 to 1. It is indicated that a likelihood difference is larger with respect to a contention candidate and the reliability is higher when the speech likelihood $L_s$ is closer to 1. Also, it is indicated that the reliability is lower when the speech likelihood $L_s$ is closer to 0.

The speech recognition unit 103 determines candidates for a speech recognition result from the top rank of a speech likelihood calculated by the speech likelihood calculation unit 104 to a predetermined rank. As an example, the predetermined rank is the tenth rank. The speech recognition unit 103 outputs the speech likelihood $L_s$ calculated by the speech likelihood calculation unit 104 to the object authentication unit 113.

Reference literature; www.ieice-hbkb.org/files/02/02gun_07hen_02.pdf (retrieved on the web on Mar. 19, 2017), Koichi Shinoda, Akinori Ito, Akinobu Lee, "Group 2 (image, sound, and language)—Volume 7 (speech recognition and synthesis) Chapter 2: speech recognition" ver. 1, the Institute of Electronics, Information and Communication Engineers (IEICE) "Knowledge Base," IEICE, 2010, pp. 2 to 12

The category estimation unit 105 refers to the acoustic model/dictionary DB 102 to determine categories of candidates for the speech recognition result from the top rank of the likelihood to the predetermined rank. The category estimation unit 105 outputs category information indicating the determined categories and the candidates for the speech recognition result from the top rank of the likelihood to the predetermined rank to the image model generation unit 108. Also, the category information includes at least one category, and may include a plurality of categories. In this case, information indicating an order of likelihood is added to the category. For example, if candidates for the speech recognition result up to the predetermined rank in descending order of likelihoods are "apple," "orange," "peach," "pear," "ball," "glass beads," and the like, the categories in descending order of likelihoods are "fruits" and "toys."

The image acquisition unit 106 acquires an image output by the imaging device 3 and outputs the acquired image to the image recognition unit 110.

In the image model DB 107, an image model is stored. The image model is a model based on a feature quantity of the image. In the image model DB 107, as will be described below with reference to FIG. 4, the image model is stored for each category of object. Also, the image model DB 107 may store images. In this case, it is preferable for resolutions of the images to be the same. When the resolutions are different, the image model generation unit 108 generates an image model by normalizing the resolutions.

The image model generation unit 108 retrieves information regarding whether or not image models of candidates for the speech recognition result from the top rank of the speech likelihood output by the speech recognition unit 103 to the predetermined rank are stored in the image model DB 107 using the candidates for the speech recognition result from the top rank of the speech likelihood to the predetermined rank and category information of the candidates. The image model generation unit 108 performs retrieval for each category.

As described above, because the images are classified and stored for each category in the image model DB 107, the image model generation unit 108 can perform retrieval for each category, so that it is possible to increase a processing time of the retrieval of images.

If image models of candidates for a speech recognition result are stored in the image model DB 107, the image model generation unit 108 acquires a corresponding image model from the image model DB 107.

If the image models of the candidates for the speech recognition result are not stored in the image model DB 107, the image model generation unit 108 acquires images corresponding to the candidates for the speech recognition result from the image server 4 or the network (the Internet) using the URL address stored in the storage unit 109 to control the communication unit 112. Also, the URL address accessed by the communication unit 112 may be stored in the image model generation unit 108 or the communication unit 112. More specifically, if the image model of "glass beads" is not stored in the image model DB 107, the image model generation unit 108 acquires at least one image of "glass beads." Also, the image model generation unit 108 may be configured to acquire a resolution of the acquired image and normalize the acquired resolution when the acquired resolution is different from a predetermined value. The image model generation unit 108 extracts a feature quantity of the acquired image and generates an image model using the extracted feature quantity. A method of generating an image model using an image acquired from the image server 4 or the network (the Internet) will be described below with reference to FIG. 7.

The image model generation unit 108 outputs the image model acquired from the image model DB 107 or the generated image model to the image recognition unit 110 in descending order of speech likelihoods.

The storage unit 109 stores a URL address of the image server 4. As will be described below with reference to FIG. 5, the URL address is classified according to each category.

The image recognition unit 110 calculates an image feature quantity of an image output by the imaging device 3. Also, the image feature quantity may be, for example, at least one of a wavelet for the entire target object, a scale-invariant feature transform (SIFT) feature quantity or a speeded up robust features (SURF) feature quantity for local information of the target object, Joint HOG, which is a joint of local information, and the like. Also, the image recognition unit 110 may be configured to calculate an image feature quantity for an image obtained by performing horizontal inversion on the image output by the imaging device 3.

The image likelihood calculation unit 111 calculates an image likelihood $L_v(v;o_i)$ for each candidate using the calculated image feature quantity and the image models output by the image model generation unit 108, for example, the HMM. Also, the image likelihood $L_v(v;o_i)$ is obtained by calculating a posterior probability $p(o_i|v)$. Here, v is an image feature quantity, and $o_i$ is an image model of an $i^{th}$ object output by the image model generation unit 108. Also, the image likelihood $L_v$ is a value from 0 to 1. It is indicated that a likelihood difference is larger with respect to a contention candidate and the reliability is higher when the image likelihood $L_v$ is closer to 1. Also, it is indicated that the reliability is lower when the image likelihood $L_v$ is closer to 0.

The image recognition unit 110 determines candidates for an image recognition result from the top rank of a likelihood calculated by the image likelihood calculation unit 111 to a predetermined rank. As an example, the predetermined rank is a tenth rank. The image recognition unit 110 outputs the image likelihood $L_v$ calculated by the image likelihood calculation unit 111 to the object authentication unit 113.

In accordance with control of the image model generation unit 108, the communication unit 112 accesses the image server 4 or the network (the Internet) and acquires an image.

Using the speech likelihood $L_s$ output by the speech recognition unit 103 and the image likelihood $L_v$ output by the image recognition unit 110, the object authentication unit 113 performs integration according to a logistic function of the following Equation (1) to obtain an object likelihood $F_L$ for each candidate.

$$F_L(L_s, L_v) = \frac{1}{1 + e^{-(\alpha_0 + \alpha_1 L_s + \alpha_2 L_v)}} \quad (1)$$

In Equation (1), v is an input image, $o_i$ is an $i^{th}$ image model, and $\alpha_0$, $\alpha_1$, and $\alpha_2$ are parameters of the logistic function.

The object authentication unit 113 estimates a candidate $\hat{i}$ having a maximum object likelihood $F_L$ calculated using the following Equation (2).

$$\hat{i} = \underset{i}{\mathrm{argmax}} F_L(L_s(s; \Lambda_i), L_v(v; o_i)) \quad (2)$$

Also, in Equation (2), arg max $F_L(\ldots)$ is a function for providing $F_L$ that maximizes . . . .

Also, although an example in which the speech likelihood $L_s$ and the image likelihood $L_v$ are integrated using a logistic function has been described in the above-described example, the present invention is not limited thereto. They may be integrated using other functions.

Here, an outline of the SIFT feature quantity will be described.

A process of the SIFT is roughly divided into two steps of detection of feature points and description of feature quantities. In the detection of feature points, a point considered as an image feature (a key point) is determined from a difference between smoothed images with different scales. Then, information is described using the gradient information of a surrounding image around each key point. Next, by calculating a difference between the scales, a position of appearance of a change in the image (a boundary between an object and a background or the like) is calculated. A point at which this change is maximized is a candidate for a feature point (a key point) of the SIFT. In order to retrieve this point, differential images are arranged and extreme values are retrieved. The SIFT feature is obtained by describing an image gradient around this key point.

Next, an example of information stored in the acoustic model/dictionary DB 102 will be described.

FIG. 2 is a diagram illustrating an example of information stored in the acoustic model/dictionary DB 102 according to the present embodiment.

As illustrated in FIG. 2, the acoustic model/dictionary DB 102 stores items (words and vocabularies) for each category. For example, the categories are "vehicles," "fruits," "tableware," and the like. In the category "vehicles, items "Shinkansen," "motorcycle," "car," "train," and the like are stored.

Next, an example of a word dictionary stored in the acoustic model/dictionary DB 102 will be described.

FIG. 3 is a diagram illustrating an example of a dictionary stored in the acoustic model/dictionary DB 102 according to the present embodiment.

As illustrated in FIG. 3, in the present embodiment, when there are a plurality of items (nomenclature and notation) for one word, they are stored in association with one word. For example, "apple juice" and "ringo juice" are associated with "ringo juice."

Next, an example of information stored in the image model/dictionary DB 107 will be described.

Figures 4, 5:
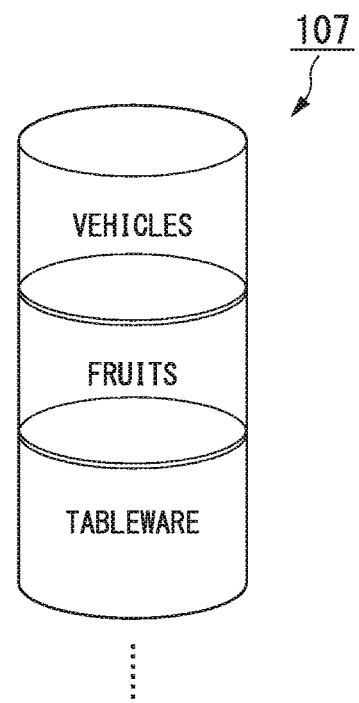
FIG. 4 is a diagram illustrating an example of information stored in an image model/dictionary DB according to the present embodiment.
FIG. 5 is a diagram illustrating an example of a URL address stored in a storage unit according to the present embodiment.

FIG. 4 is a diagram illustrating an example of information stored in the image model/dictionary DB 107 according to the present embodiment.

As illustrated in FIG. 4, the image model/dictionary DB 107 separately stores image models for each category. In the example illustrated in FIG. 4, the categories are "vehicles," "fruits," "tableware," and the like. Also, categories used in the image model/dictionary DB 107 match categories used in the acoustic model/dictionary DB 102. In the case of an item of an acquired image absent in the image model/dictionary DB 107, the image recognition unit 110 may be configured to add a new category or item to the image model on the basis of a recognition result.

Next, an example of a URL address stored in the storage unit 109 will be described.

FIG. 5 is a diagram illustrating an example of a URL address stored in the storage unit 109 according to the present embodiment.

As illustrated in FIG. 5, at least one URL address is stored as the ULR address of the image server 4 for each category. Also, the image server 4 may be configured to store at least one image or a plurality of images in each URL address.

In the example illustrated in FIG. 5, a first URL address "http://www.norimono1," a second URL address "http://www.norimono2," a third URL address "http://www.norimono3," and the like are associated with respect to the "category" of the vehicles. Image information of an airplane is stored in the first URL address "http://www.norimono1," image information of a yacht is stored in the second URL address "http://www.norimono2," and image information of a tanker is stored in the third URL address "http://www.norimono3."

Next, an example of a processing procedure performed by the object authentication device 1 will be described.

Figure 6:
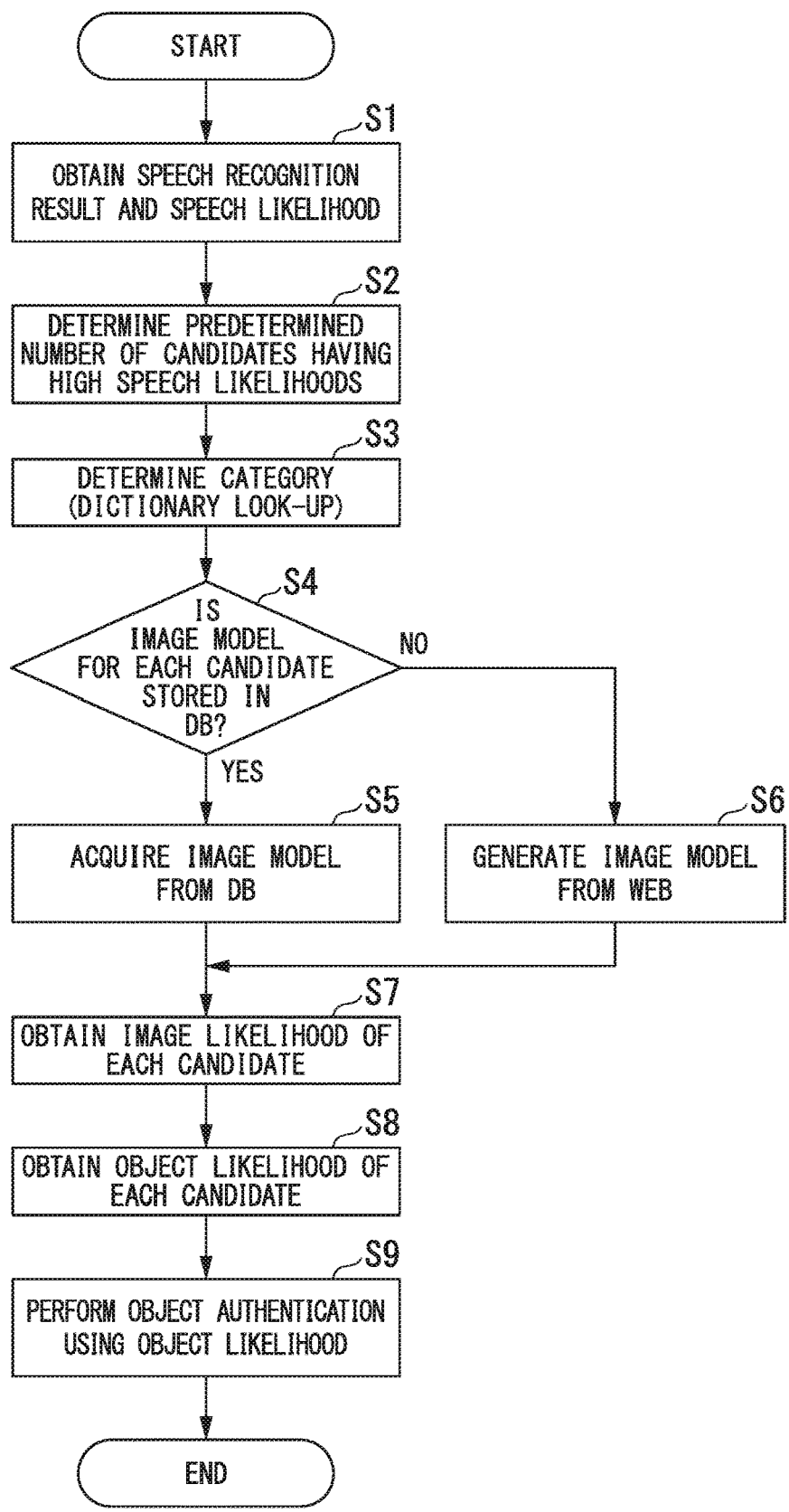
FIG. 6 is a flowchart illustrating an example of a processing procedure of object authentication performed by the object authentication device according to the present embodiment.

FIG. 6 is a flowchart illustrating an example of a processing procedure of object authentication by the object authentication device 1 according to the present embodiment.

(Step S1) The speech recognition unit 103 extracts an acoustic feature quantity from a speech signal acquired by the speech signal acquisition unit 101 from the sound collection device 2. Subsequently, the speech recognition unit 103 calculates a speech likelihood $L_s(s;\Lambda_i)$ using, for example, an HMM, with reference to the acoustic model/dictionary DB 102 with respect to the extracted acoustic feature quantity.

(Step S2) The speech recognition unit 103 determines candidates for a speech recognition result from the top rank of a likelihood calculated by the speech likelihood calculation unit 104 to a predetermined rank.

(Step S3) The category estimation unit 105 determines categories of the candidates for the speech recognition result from the top rank of the likelihood to the predetermined rank with reference to the acoustic model/dictionary DB 102.

(Step S4) The image model generation unit 108 determines whether or not image models of candidates for the speech recognition result from the top rank of the speech likelihood output by the speech recognition unit 103 to the predetermined rank are stored in the image model DB 107 using the candidates for the speech recognition result from the top rank of the speech likelihood to the predetermined rank and category information of the candidates. If it is determined that the image models for the candidates for the speech recognition result are stored in the image model DB 107 (step S4; YES), the image model generation unit 108 moves the process to step S5. If it is determined that the image models for the candidates for the speech recognition result are not stored in the image model DB 107 (step S4; NO), the image model generation unit 108 moves the process to step S6.

(Step S5) The image model generation unit 108 acquires corresponding image models from the image model DB 107. The image model generation unit 108 outputs the acquired image models to the image recognition unit 110 in descending order of likelihoods and moves the process to step S7.

(Step S6) The image model generation unit 108 acquires images corresponding to the candidates for the speech recognition result from the image server 4 or the network (the web: World Wide Web) by controlling the communication unit 112 with the URL address stored in the storage unit 109. The image model generation unit 108 generates image models from the acquired images, outputs the generated image models to the image recognition unit 110 in descending order of likelihoods, and moves the process to step S7.

(Step S7) The image likelihood calculation unit 111 calculates an image likelihood $L_v(v;o_t)$ for each candidate using the calculated image feature quantity and the image models output by the image model generation unit 108, for example, the HMM.

(Step S8) Using the speech likelihood $L_s$ output by the speech recognition unit 103 and the image likelihood $L_v$ output by the image recognition unit 110, the object authentication unit 113 performs integration according to a logistic function of the above-described Equation (1) to obtain an object likelihood $F_L$ for each candidate.

(Step S9) The object authentication unit 113 authenticates an object by obtaining a candidate for which the object likelihood $F_L$ calculated using the above-described Equation (2) becomes maximum.

Accordingly, the process of object authentication of the object authentication device 1 is completed.

Next, an example of a processing procedure of generating an image model by acquiring an image from the image server 4 will be described.

Figure 7:
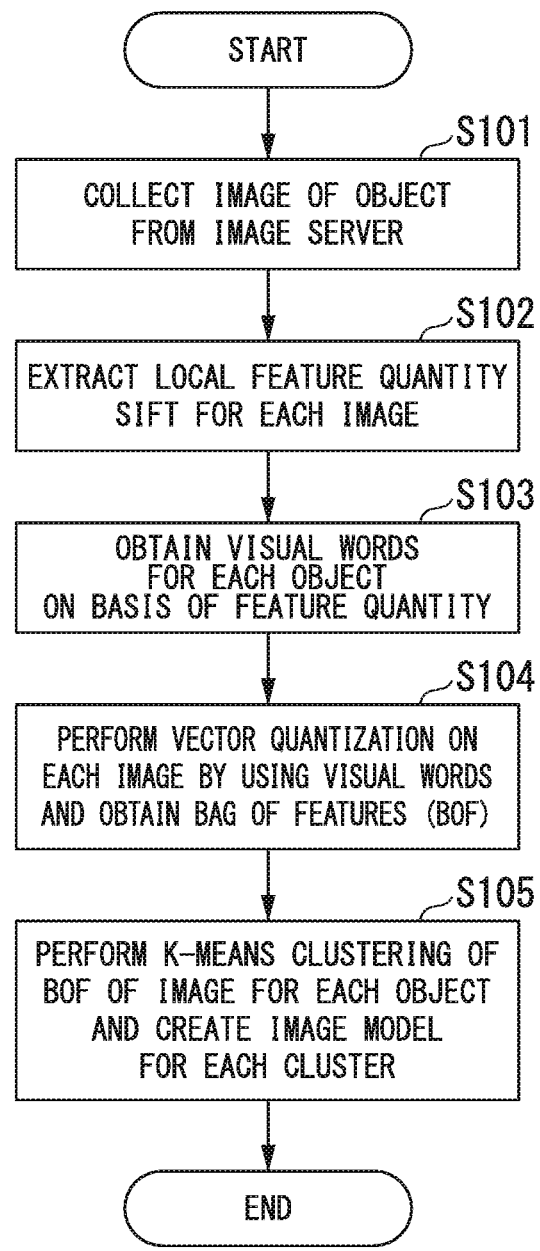
FIG. 7 is a flowchart illustrating an example of a processing procedure of acquiring an image from an image server and generating an image model according to the present embodiment.

FIG. 7 is a flowchart illustrating an example of a processing procedure for acquiring an image from the image server 4 and generating an image model according to the present embodiment.

(Step S101) The image model generation unit 108 acquires (collects) images of objects corresponding to candidates for a recognition result from the image server 4.

(Step S102) For example, the image model generation unit 108 extracts an SIFT feature quantity for an image of each of the candidates.

(Step S103) The image model generation unit 108 obtains visual words for each object on the basis of the SIFT feature quantity. Here, the visual words will be described. For example, in a bag of features (BoF), SIFT features and SURF features are extracted from images of objects and are classified into W clusters according to a k-means method. A vector serving as the centroid (the center of gravity) of each cluster is referred to as a visual word and the number thereof is determined empirically. Specifically, the image model generation unit 108 executes k-means clustering (a K average method) of SIFT feature quantities of all images, and sets centers of clusters as the visual words. Also, the visual words correspond to a typical local pattern.

(Step S104) The image model generation unit 108 performs vector quantization on each candidate image using the visual words to obtain a BoF representation of each image. The BoF representation represents an image according to appearance frequencies (histograms) of the visual words.

(Step S105) The image model generation unit 108 performs k-means clustering of the BoF for each object of a recognition candidate and generates an image model for each cluster.

Although an example in which the image model generation unit 108 acquires an image from the image server 4 to generate an image model when an image of a candidate for a speech recognition result is not stored in the image model DB 107 has been described in the above-described example, the present invention is not limited thereto. The image model generation unit 108 may be configured to acquire an image from the image server 4 even when an image of a candidate for a speech recognition result is stored in the image model DB 107. In this case, the image model generation unit 108 may be configured to generate a second image model for a second image acquired from the image server 4. The image model generation unit 108 may be configured to output a first image model acquired from the image model DB 107 and the generated second image model to the image recognition unit 110. Then, the image likelihood calculation unit 111 may be configured to calculate image likelihoods of the first image model and the generated second image model and select the image model having a higher image likelihood.

As described above, in the present embodiment, a model (a category/dictionary) corresponding to speech recognition is held and a category is recognized when speech recognition is performed. Also, in the present embodiment, images are stored according to each category in the image model DB 107, and images are retrieved from the stored images. Also, in the present embodiment, the image server 4 is configured so that a URL address or the like is assigned for each category and an image is retrieved therefrom. Furthermore, in the present embodiment, among the image data acquired from the image model DB 107 and the image server 4, image data having a high image likelihood is selected.

Thereby, according to the present embodiment, there is an advantageous effect in that it is possible to improve an authentication speed when the object is authenticated in a model because speech information and image information are categorized and stored.

Also, according to the present embodiment, it is possible to retrieve a target image in a wider range via a network and improve the accuracy of authentication.

Also, according to the present embodiment, it is possible to improve a retrieval speed and improve an object authentication speed because images are stored according to each category even when an image is retrieved via a network.

Also, according to the present embodiment, because the acoustic model/dictionary DB 102 used for speech recognition is also configured so that speech models are separately classified according to each category and stored, a speed of the retrieval according to the speech likelihood is increased.

Also, according to the present embodiment, words having the same meaning are registered as a dictionary, so that the accuracy of speech recognition can be improved.

Also, according to the present embodiment, because the likelihoods of the first image model stored in the image model DB 107 and the second image model based on the image acquired from the image server 4 are compared and the image model having the higher likelihood is selected, the accuracy of object authentication can be improved.

Although an example in which the sound collection device 2 and the imaging device 3 are connected to the object authentication device 1 has been described in the above-described example, the sound collection device 2 and the imaging device 3 may be provided in the object authentication device 1.

Also, all or a part of processing to be performed by the object authentication device 1 may be performed by recording a program for implementing all or some of the functions of the object authentication device 1 according to the present invention on a computer-readable recording medium and causing a computer system to read and execute the program recorded on the recording medium. Also, the "computer system" used here is assumed to include an operating system (OS) and hardware such as peripheral devices. In addition, the computer system is assumed to include a homepage providing environment (or displaying environment) when a World Wide Web (WWW) system is used. In addition, the computer-readable recording medium refers to a storage device, including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for holding the program for a predetermined time as in a volatile memory (a random access memory (RAM)) inside the computer system including a server and a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit. Also, the above-described program may be a program for implementing some of the above-described functions. Further, the above-described program may be a program capable of implementing the above-described function in combination with a program already recorded on the computer system, i.e., a so-called differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An object authentication device, comprising at least one processor and a memory storing thereon a program which, when executed by the at least one processor, causes the object authentication device to function as:
    an acoustic model dictionary database configured to store names of objects for each category of the objects;
    a speech recognition unit configured to determine speech likelihoods from an input speech with reference to the acoustic model dictionary database for each name of the objects which are recognition result candidates from a top to a predetermined rank of the speech likelihoods;
    a category estimation unit configured to determine categories for each name of the objects which are the recognition result candidates with reference to only categories corresponding to the names of the objects which are stored in the acoustic model dictionary database;
    an image model database configured to store image models of objects for each category of the objects;
    an image model acquisition unit configured to acquire the image models corresponding to the categories determined by the category estimation unit from the image model database;
    an image likelihood calculation unit configured to calculate image likelihoods of an image on the basis of the image models acquired by the image model acquisition unit for each recognition result candidate from a top to a predetermined rank of the image likelihoods; and
    an object authentication unit configured to calculate object likelihoods by integrating the speech likelihoods and the image likelihoods for each recognition result candidate and estimate the name of the object which is the recognition result candidate where the object likelihood becomes maximum.

2. The object authentication device according to claim 1, wherein, in a case where the image models corresponding to the categories determined by the category estimation unit are not stored in the image model database, the image model acquisition unit acquires an image of the object in the category via a network and generates the image model of the object in the category from the acquired image.

3. The object authentication device according to claim 1, wherein the object authentication device is further configured to function as:
    a storage unit configured to store a uniform resource locator (URL) address of an image server for each category of the objects, the image server storing an image of an object in the category,
    wherein the image model acquisition unit acquires the image from the image server using the URL address of the category determined by the category estimation unit.

4. The object authentication device according to claim 1, wherein the acoustic model dictionary database further stores items indicating a plurality of nomenclatures for each word.

5. An object authentication method, comprising:

an acoustic model dictionary database storing step in which an acoustic model dictionary database, implemented via a computer memory and at least one processor, stores names of objects for each category of the objects;

a speech recognition step in which a speech recognition unit, implemented via at least one processor, determines speech likelihoods from an input speech with reference to the acoustic model dictionary database for each name of the objects which are recognition result candidates from a top to a predetermined rank of the speech likelihoods;

a category estimation step in which a category estimation unit, implemented via at least one processor, determines categories for each name of the objects which are the recognition result candidates with reference to only categories corresponding to the names of the objects which are stored in the acoustic model dictionary database;

an image model database storing step in which an image model database, implemented via a computer memory and at least one processor, stores image models of objects for each category of the objects;

an image model acquisition step in which an image model acquisition unit, implemented via at least one processor, acquires the image models corresponding to the categories determined by the category estimation unit from the image model database;

an image likelihood calculation step in which an image likelihood calculation unit, implemented via at least one processor, calculates image likelihoods of an input image on the basis of the image models acquired by the image model acquisition unit for each recognition result candidate from a top to a predetermined rank of the image likelihoods; and an object authentication step in which an object authentication unit, implemented via at least one processor, calculates object likelihoods by integrating the speech likelihoods and the image likelihoods for each recognition result candidate and estimates the name of the object which is the recognition result candidate where the object likelihood becomes maximum.

* * * * *